United States Patent
Hoover et al.

(10) Patent No.: US 10,633,096 B1
(45) Date of Patent: Apr. 28, 2020

(54) SUPPLEMENTAL RECLINE PANEL FOR AIRCRAFT CABIN ATTENDANT SEAT

(71) Applicant: AMI Industries, Inc., Colorado Springs, CO (US)

(72) Inventors: Douglas E Hoover, Colorado Springs, CO (US); Dominic J. Maglia, Pueblo, CO (US); Akhil Rajagopal Kozhipuram, Bangalore (IN); Pradeep Acharya, Bangalore (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 16/200,769

(22) Filed: Nov. 27, 2018

(51) Int. Cl.
*B64D 11/06* (2006.01)
*A47C 1/034* (2006.01)
*A47C 7/44* (2006.01)

(52) U.S. Cl.
CPC .......... *B64D 11/064* (2014.12); *A47C 1/0342* (2013.01); *A47C 7/44* (2013.01); *B64D 11/0643* (2014.12); *B64D 11/0691* (2014.12)

(58) Field of Classification Search
USPC ........................................... 297/284.4, 284.5
See application file for complete search history.

(56) References Cited

U.S. PATENT DOCUMENTS

| | | | | |
|---|---|---|---|---|
| 3,762,769 A * | 10/1973 | Poschl | .................. | A47C 7/462 297/284.4 |
| 5,087,098 A * | 2/1992 | Ishizuka | ................ | A47C 7/462 297/284.4 |
| 5,385,388 A * | 1/1995 | Faiks | .................. | A47C 1/03255 297/284.4 |
| 6,260,921 B1 * | 7/2001 | Chu | ........................ | A47C 7/465 297/284.4 |
| 8,210,607 B2 * | 7/2012 | Takayasu | ............... | B60N 2/888 297/216.12 |
| 8,272,691 B2 * | 9/2012 | Hsuan-Chin | ............. | A47C 7/46 297/284.4 |
| 8,632,126 B2 * | 1/2014 | Nitsuma | .............. | B60N 2/4228 297/216.13 |
| 9,540,108 B2 | 1/2017 | Ehlers et al. | | |
| 2009/0212616 A1 * | 8/2009 | McMillen | .............. | A47C 7/462 297/284.4 |
| 2009/0261637 A1 * | 10/2009 | Schmitz | ............ | A47C 1/03255 297/217.2 |
| 2016/0367033 A1 * | 12/2016 | Sigmon | .................... | A47C 1/02 |
| 2016/0376007 A1 | 12/2016 | Meindlhumer | | |
| 2018/0155033 A1 | 6/2018 | Pacheco | | |
| 2019/0020303 A1 * | 1/2019 | Madrone | ................ | F15B 15/10 |

FOREIGN PATENT DOCUMENTS

JP 06090836 A * 4/1994

* cited by examiner

*Primary Examiner* — David E Allred
(74) *Attorney, Agent, or Firm* — Snell & Wilmer, L.L.P.

(57) ABSTRACT

A retrofit seat back assembly is disclosed. In various embodiments, the assembly includes a supplemental recline panel having an upper end and a lower end; a pivot member disposed proximate the upper end and configured to pivotally engage a seat back frame of a stowable seat; an actuator disposed proximate the lower end and configured to operably engage the seat back frame and move the supplemental recline panel between a retracted position and a deployed position; and a bias element disposed between the supplemental recline panel and the seat back frame and configured to urge the supplemental recline panel toward the seat back frame.

15 Claims, 8 Drawing Sheets

SUPPLEMENTAL RECLINE PANEL FOR AIRCRAFT CABIN ATTENDANT SEAT

CROSS-REFERENCE TO RELATED APPLICATIONS

This application claims priority to, and the benefit of, Indian Prov. Pat. Appl., Serial No. 201811039086, entitled "Supplemental Recline Panel for Aircraft Cabin Attendant Seat," filed on Oct. 15, 2018 at the Indian Patent Office, the entirety of which is incorporated herein for all purposes by this reference.

FIELD

The present disclosure relates to aircraft cabin attendant seats and, more particularly, to supplemental recline panels configured to retrofit aircraft cabin attendant seats.

BACKGROUND

Aircraft cabin seats (also referred to as stowable seats or jump seats) are used for flight attendant safety and comfort during taxi, takeoff, landing and inflight periods of rest. Aircraft cabin seats may be used for long periods of time depending on flight duration. Traditional cabin seats may cause pain or discomfort for the crew member occupying the seat due to the non-ergonomic geometry of the seat. Further, the space available for extending a cabin seat into a more comfortable position may be minimal, as useable volumetric space on an aircraft tends to be limited and the cabin seats should not hinder ingress and egress for passengers in the event of an emergency. Such seats may also be subject to various regulations and requirements. For example, under European Union regulations, a seat in Class II (i.e., a seat in an aircraft cabin or flight crew compartment) is required to recline at a back angle of at least forty-five degrees (45°) with respect to the vertical. Existing seats configured to recline at back angles less than that mandated by regulation will benefit from retrofit systems or apparatus or methods of retrofitting configured to bring the seats into compliance with such regulation. In addition, the ability to rapidly convert or retrofit existing seats to seats having an increased back angle—e.g., on the order of fifteen minutes or less—together with the resulting retrofit seat being intuitive and natural for an occupant to use may be of beneficial importance.

SUMMARY

A retrofit seat back assembly is disclosed. In various embodiments, the assembly includes a supplemental recline panel having an upper end and a lower end; a pivot member disposed proximate the upper end and configured to pivotally engage a seat back frame of a stowable seat; an actuator disposed proximate the lower end and configured to operably engage the seat back frame and move the supplemental recline panel between a retracted position and a deployed position; and a bias element disposed between the supplemental recline panel and the seat back frame and configured to urge the supplemental recline panel toward the seat back frame.

In various embodiments, the bias element comprises a spring having a first spring end connected to the supplemental recline panel and a second spring end connected to the seat back frame. In various embodiments, the bias element further comprises a main body configured for disposition within a lower aperture of the seat back frame and the second spring end is connected to the main body. In various embodiments, the main body comprises a flange configured to engage a first surface of the seat back frame and is configured to receive a retaining clip proximate a second surface of the seat back frame. In various embodiments, the bias element further comprises a spring bracket configured for disposition on the supplemental recline panel and wherein the first spring end is connected to the spring bracket.

In various embodiments, the actuator comprises a lever pivotally attached to the supplemental recline panel proximate the lower end, the lever having a distal end configured for rolling engagement with the seat back frame. In various embodiments, the seat back frame includes a frame arm having a lower cutout section and wherein the distal end of the lever includes a roller configured for rolling engagement with a surface of the lower cutout section. In various embodiments, the roller is configured to abut a locking end of the lower cutout section when the supplemental recline panel assumes the deployed position.

In various embodiments, the seat back frame includes a frame arm having an upper cutout section and the pivot member comprises a pivot tab configured to engage a surface of the upper cutout section of the frame arm. In various embodiments, a stabilizer bracket is configured to engage an upper aperture of the seat back frame.

A seat back assembly configured to retrofit a stowable seat having a seat back frame is disclosed. In various embodiments, the assembly includes a supplemental recline panel having an upper panel end, a lower panel end, a first panel side and a second panel side; a first pivot tab attached to the upper panel end and configured to pivotally engage a first frame arm of the seat back frame; a second pivot tab attached to the upper panel end and configured to pivotally engage a second frame arm of the seat back frame; a first lever pivotally connected to the lower panel end and configured to operably engage the first frame arm of the seat back frame between a retracted position and a deployed position; and a second lever pivotally connected to the lower panel end and configured to operably engage the second frame arm of the seat back frame between the retracted position and the deployed position.

In various embodiments, a first bias element is disposed proximate the first lever and between the supplemental recline panel and the seat back frame and is configured to urge the supplemental recline panel toward the seat back frame. In various embodiments, the first bias element includes a first spring connected to the supplemental recline panel and to the seat back frame. In various embodiments, a second bias element is disposed proximate the second lever and between the supplemental recline panel and the seat back frame and is configured to urge the supplemental recline panel toward the seat back frame. In various embodiments, the second bias element includes a second spring connected to the supplemental recline panel and to the seat back frame.

In various embodiments, the first lever comprises a first distal end configured for rolling engagement with a first lower cutout section of the first frame arm of the seat back frame. In various embodiments, the second lever comprises a second distal end configured for rolling engagement with a second lower cutout section of the second frame arm of the seat back frame. In various embodiments, the first distal end of the first lever includes a first roller configured for rolling engagement with a first surface of the first lower cutout section and the second distal end of the second lever includes a second roller configured for rolling engagement with a second surface of the second lower cutout section.

A method of retrofitting a stowable seat having a seat back frame is disclosed. In various embodiments, the method includes the steps of providing a retrofit seat back assembly, comprising: a supplemental recline panel having an upper end and a lower end, a pivot disposed proximate the upper end and configured to pivotally engage the seat back frame of the stowable seat, a lever disposed proximate the lower end and configured to operably engage the seat back frame and move the supplemental recline panel between a retracted position and a deployed position, and a spring configured for disposition between the supplemental recline panel and the seat back frame and configured to urge the supplemental recline panel toward the seat back frame; and assembling the retrofit seat back assembly onto the seat back frame.

In various embodiments, the step of the assembling the retrofit seat back assembly onto the seat back frame includes: engaging the pivot with an upper cutout section of a frame arm of the seat back frame; engaging a distal end of the lever with a lower cutout section of the frame arm; and connecting the spring between the supplemental recline panel and the seat back frame.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined. As used herein, "distal" refers to the direction outward, or generally, away from a reference component. As used herein, "proximal" or "proximate" refer to a direction inward, or generally, towards the reference component.

Figure 1A:
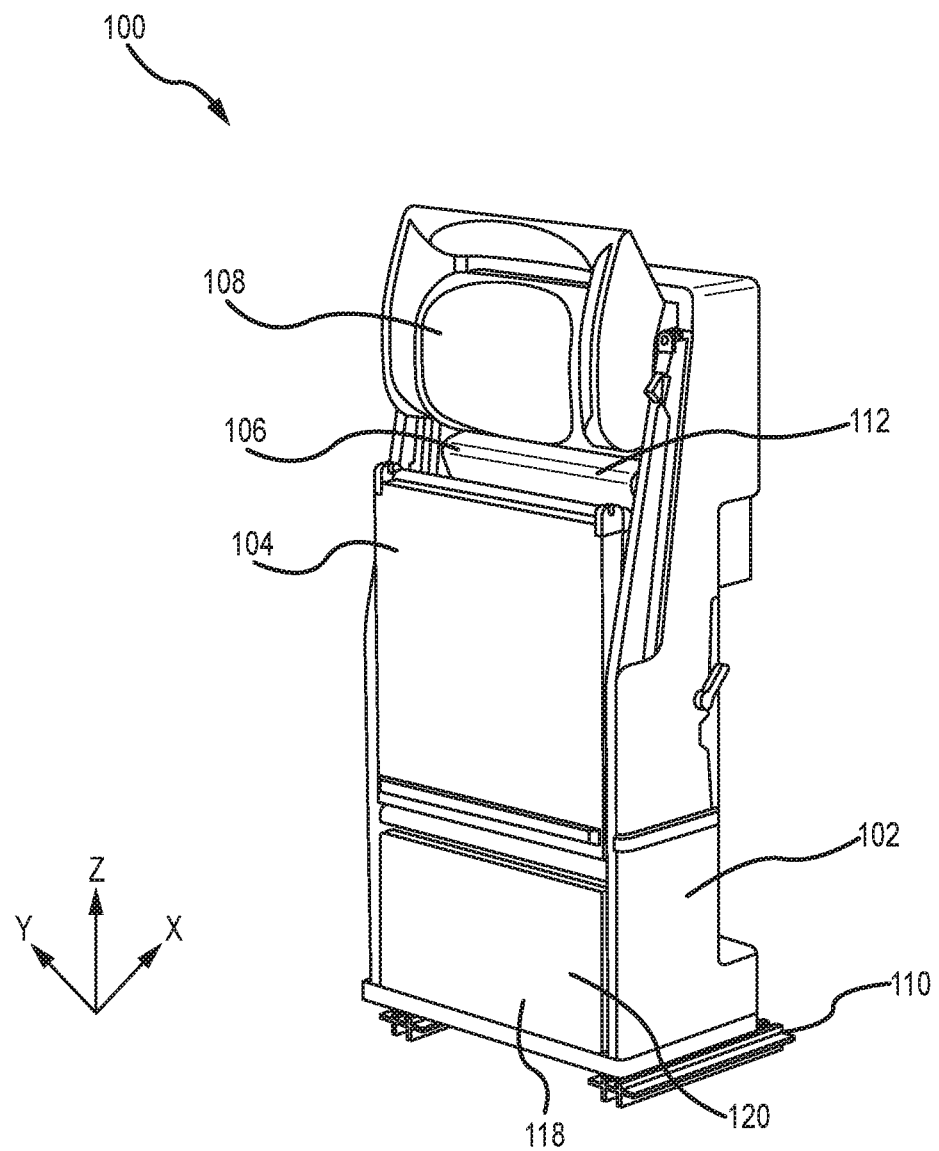
FIGS. 1A, 1B and 1C are perspective schematic views of a stowable seat, in accordance with various embodiments.
Figure 1B:
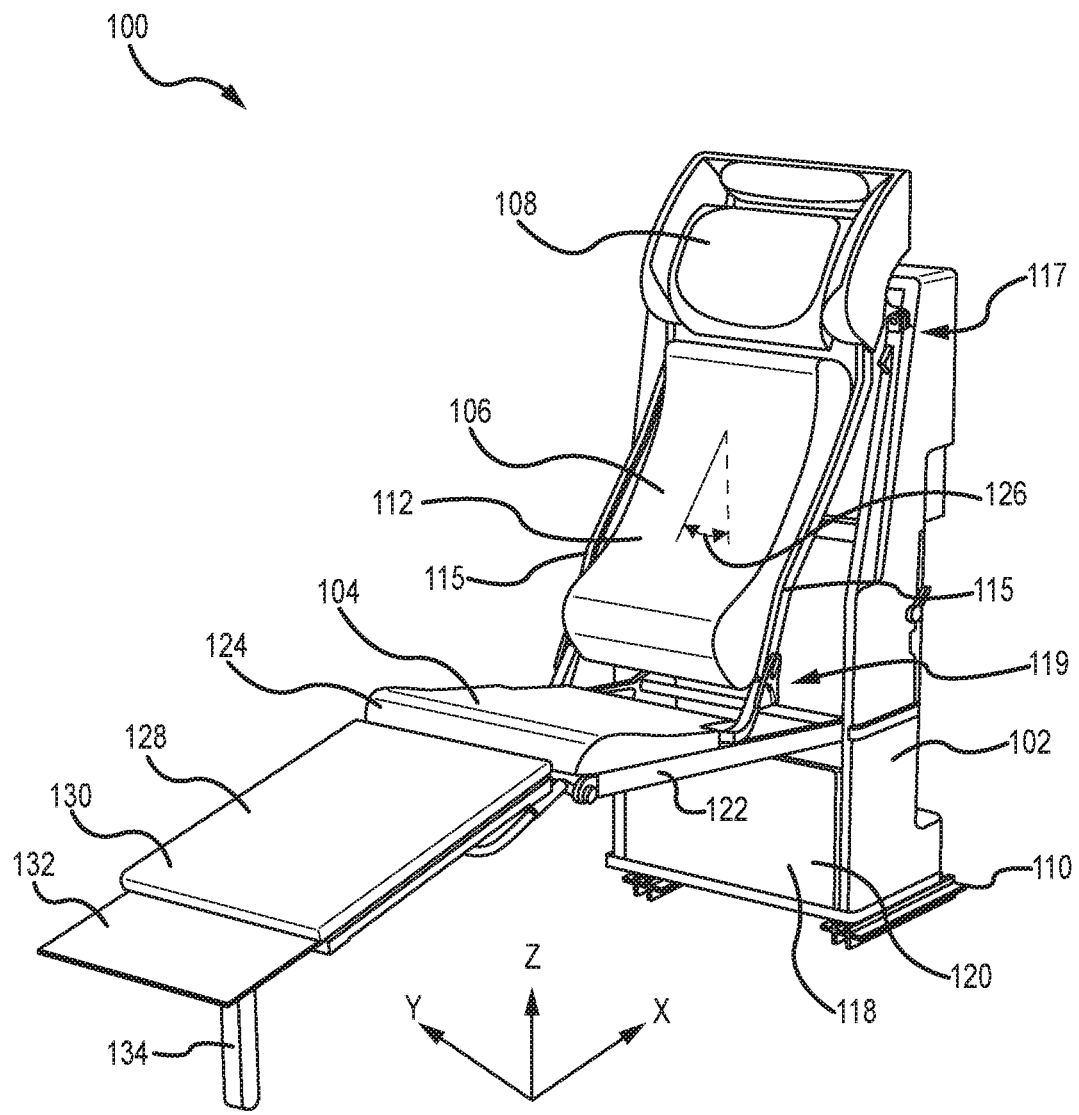
Figure 1C:
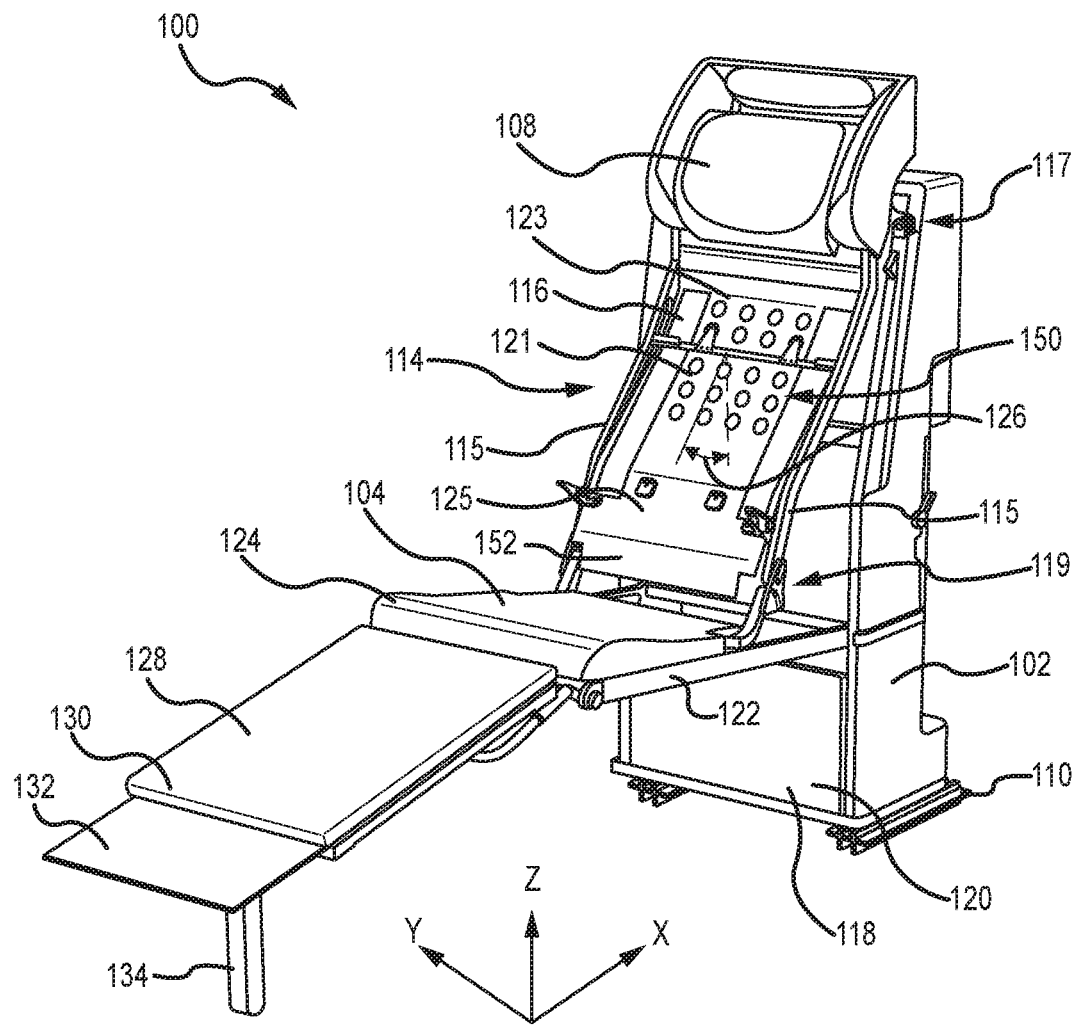

Referring now to the drawings, FIGS. 1A, 1B and 1C illustrate a stowable seat 100 in a stowed position (FIG. 1A) and a deployed position (FIGS. 1B and 1C). In various embodiments, the stowable seat 100 includes a housing 102 that may be used to store a seat bottom 104, a seat back 106 and a head rest 108. The housing 102 provides structural support for the various components comprising the stowable seat 100. In various embodiments, a depth (in the X-direction) defines an envelope of the stowable seat 100 in the stowed position. In various embodiments, the depth may be less than about twelve inches (12") (30.5 cm). For example, the depth of the stowable seat 100 in the stowed position may be eleven and one-half inches (11.5") (29.21 cm) at the base of housing 102. Similarly, a width (in the Y-direction) may further define the envelope of the stowable seat 100. In various embodiments, the width may be approximately twenty inches (20") (50.8 cm), for example. In various embodiments, feet or tracks 110 may protrude downward (e.g., in a negative Z-direction) from the housing 102 of the stowable seat 100 and provide a mounting point to mount the stowable seat 100 to an aircraft floor.

In various embodiments, the seat back 106 may protrude vertically (e.g., in a substantially positive Z-direction) from the housing 102 when the stowable seat 100 assumes the stowed position. The seat bottom 104 may pivot upward (e.g., in the positive Z-direction) and towards the seat back 106 so that the seat bottom 104 is disposed at least partially in the housing 102. In various embodiments, the seat back 106 may include a cushion 112 facing outward from the housing 102. The cushion 112 may be removably attached to a seat back frame 114 (see, e.g., FIG. 1C) via, for example, one or more assemblies of hook and loop strips 116 or the like. In various embodiments, the seat back frame 114 includes a pair of frame arms 115 that are pivotally connected at an upper end 117 to the housing 102 and at a lower end 119 to the seat bottom 104. The seat back frame 114 also includes a main recline panel 121, attached to the pair of frame arms 115, which includes an upper plurality of apertures 123 and a lower plurality of apertures 125. In various embodiments, the upper plurality of apertures 123 and the lower plurality of apertures 125 serve to reduce the overall weight of the stowable seat 100. In various embodiments, a door 118 may open into a stow compartment 120. As described above, the stowable seat 100, while in the stowed position, may occupy less space than the stowable seat 100, while in the deployed position. In this regard, the stowable seat 100 may be stowed to conserve useable space in an aircraft or other application where space is limited.

With continued reference to FIGS. 1B and 1C, perspective views of the stowable seat 100 are shown in the deployed position, in accordance with various embodiments. The seat bottom 104 may be pivotally coupled to the housing 102 via a seat bottom frame 122, such that the seat bottom 104 may fold away from the housing 102 when assuming the deployed position. A seat bottom cushion 124 is attached to the seat bottom frame 122 and may be oriented to face upward (e.g., in the positive Z-direction) in the deployed position, wherein the term "upward," as used herein, refers to the vertical or positive Z-direction. While assuming the deployed position from the stowed position, the seat bottom 104 may slide laterally outward from the housing 102 (e.g., in the negative X-direction) along a track that is positioned within the seat bottom frame 122. In various embodiments, the seat back 106 may also translate laterally, as well as rotate (about the Y-direction) as the seat bottom 104 slides along the track until the seat back 104 is oriented at a seat back angle 126 of about forty degrees (40°) from the upward direction. In various embodiments, the stowable seat 100 also includes a leg-rest 128 coupled to seat bottom 104. The leg-rest 128 may comprise a leg-rest cushion 130 oriented to face upward (in the positive Z-direction) while in the deployed position. In various embodiments, a footrest 132 may extend from the leg-rest 128. In various embodiments, a support arm 134 may pivot downward (i.e., in the negative Z-direction) from the leg-rest 128 to provide load bearing support for the leg-rest 128.

As stated above, in various embodiments, the seat back 104 is configured, while in the deployed position, to assume a seat back angle 126 of about forty degrees (40°) from the vertical direction. Thus, the seat back angle 126 may be less than that required to satisfy various regulations, such as, for example, European Union regulations or requirements referring to a seat in the Class II aircraft seat category. Rather than having to replace all such seats within a fleet of aircraft, and bearing the associated expense and inconvenience in doing so, a retrofit seat back assembly 150, such as, for example, a supplemental recline panel 152, may be used, in various embodiments, to convert a stowable seat (such as the stowable seat 100 just described), currently configured to assume a seat back angle 126 of no more than about forty degrees (40°), to a retrofitted stowable seat, configured to assume a seat back angle 126 of about forty-five degrees (45°) or greater, such that the retrofitted stowable seat complies with regulations requiring the seat back angle 126 to be about forty-five degrees (45°) or greater.

Figure 2A:
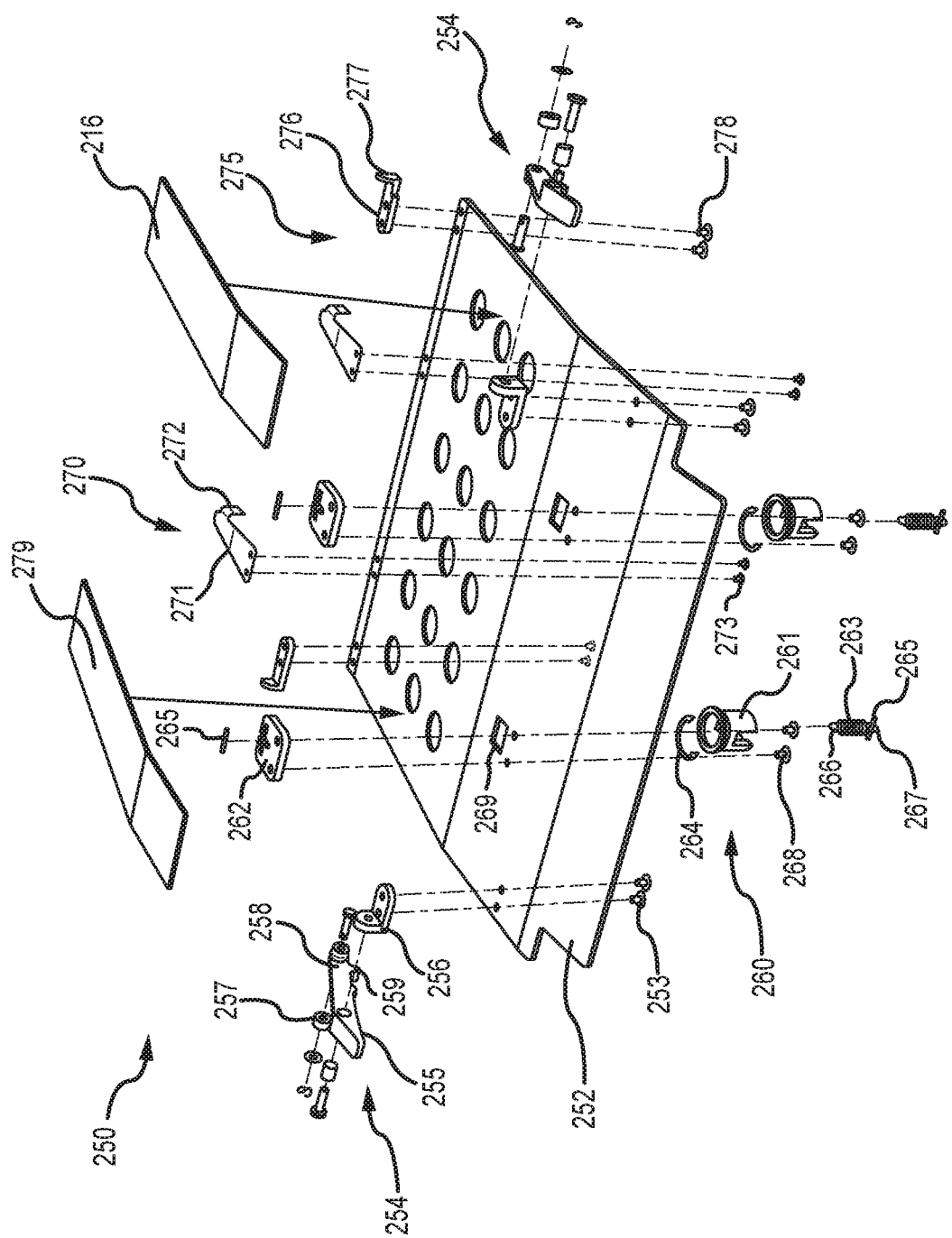
FIGS. 2A and 2B are exploded and partially assembled schematic views of a retrofit seat back assembly, in accordance with various embodiments.
Figure 2B:
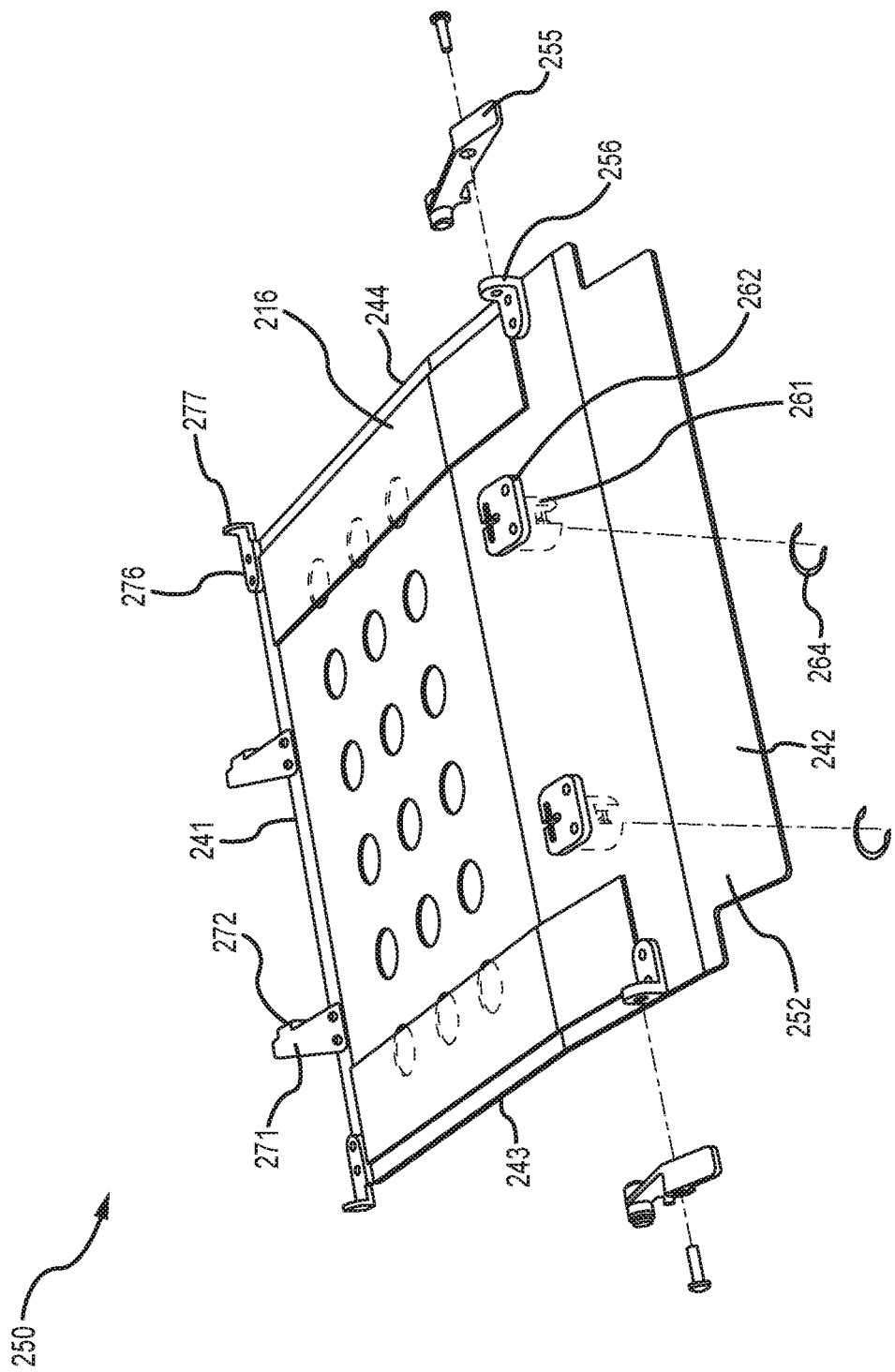

Referring now to FIGS. 2A and 2B, exploded and partially assembled views of, respectively, a retrofit seat back assembly 250 are provided, in accordance with various embodiments. The retrofit seat back assembly 250 includes a supplemental recline panel 252 that is configured for attachment to a seat back frame. In various embodiments, the supplemental recline panel includes an upper panel end 241, a lower panel end 242, a first panel side 243 and a second panel side 244, each of which has a corresponding end or side with the seat back frame. In various embodiments, the retrofit seat back assembly 250 includes an actuator which, in various embodiments, may comprise a pair of actuators 254, each of which includes a lever 255 and a lever bracket 256 configured to mount the lever to the supplemental recline panel 252. In various embodiments, as is described further below, the lever 255 is configured to receive a roller 257 positioned at a distal end 258 of the lever 255 and includes a protrusion 259 extending outwardly from the lever 255 proximate the distal end 258 of the lever 255. In various embodiments, the lever bracket 256 is attached to the supplemental recline panel 252 by one or more fasteners 253, like threaded screws, rivets or the like that are configured to extend through apertures positioned through the supplemental recline panel 252 and engage with the lever bracket 256.

In various embodiments, the retrofit seat back assembly 250 further includes a pair of bias elements 260, each of which, in various embodiments, may include a main body 261, a spring bracket 262, a spring 263 extending between the main body 261 and the spring bracket 262, a retaining clip, such as, for example, a circlip 264, and a pair of pins 265 configured to attach a first end 266 of the spring 263 (or first spring end) to the spring bracket 262 and a second end 267 of the spring 263 (or second spring end) to the main body 261. In various embodiments, the spring bracket 262 is configured for attachment to the supplemental recline panel 252 and the main body 261 is configured for attachment to a seat back frame, such as, for example, the seat back frame 114 described above with reference to FIG. 1C. The main body 261 is attached to the seat back frame using the circlip 264. In various embodiments, the spring bracket 262 is attached to the supplemental recline panel 252 by one or more fasteners 268, like threaded screws or rivets or the like that are configured to extend through apertures positioned through the supplemental recline panel 252 and engage with the spring bracket 262. In various embodiments, the spring 263 is configured to extend through an aperture 269 that extends through the supplemental recline panel 252.

In various embodiments, the retrofit seat back assembly 250 further includes a pair of stabilizer assemblies 270, each of which includes a stabilizer bracket 271 having a stabilizer tab 272 configured to engage an aperture extending through a seat back frame, such as, for example, the seat back frame 114 described above with reference to FIG. 1C. In various embodiments, the stabilizer bracket 271 is attached to the supplemental recline panel 252 by one or more fasteners 273, like threaded screws or rivets or the like that are configured to extend through apertures positioned through the supplemental recline panel 252 and engage with the stabilizer tab 272. In various embodiments, the retrofit seat back assembly 250 further includes a pair of pivot members 275, each one of which, in various embodiments, may include a pivot bracket 276 having a pivot tab 277 configured to pivotally engage a frame arm, such as, for example, one of the pair of frame arms 115 described above with reference to FIG. 1C. In various embodiments, the pivot bracket 276 is attached to the supplemental recline panel 252 by one or more fasteners 278, like threaded screws or rivets or the like that are configured to extend through apertures positioned through the supplemental recline panel 252 and engage with the pivot bracket 276. In various embodiments, one or more cushion attachment assemblies 279, such as, for example, one or more assemblies of hook and loop strips 216 or the like, similar to those described above with reference to FIG. 1C, are attached to the supplemental recline panel 252.

Figure 3A:
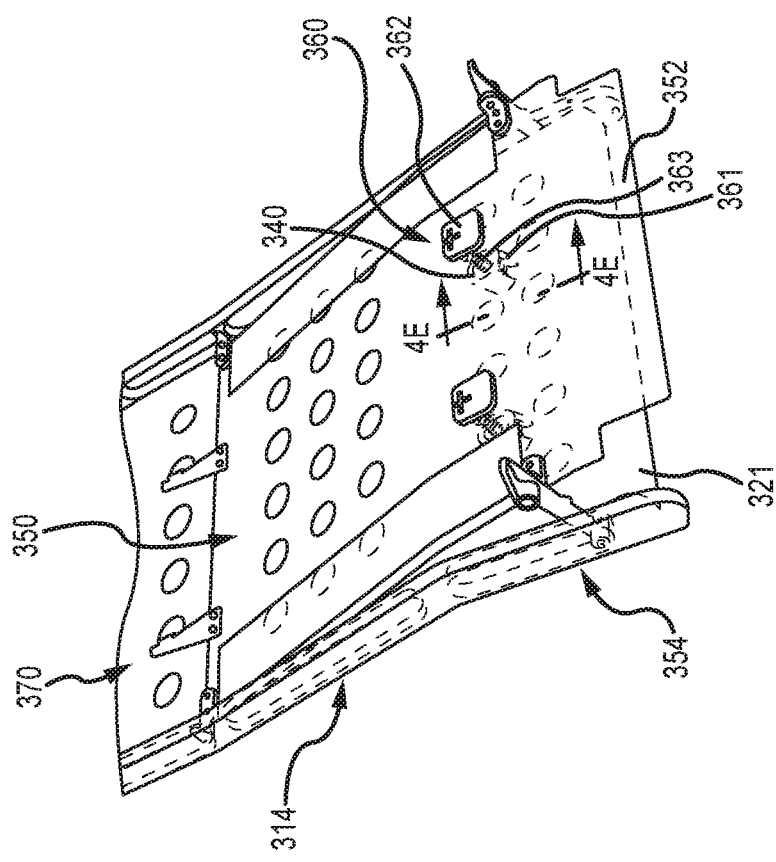
FIGS. 3A and 3B are perspective schematic views of a retrofit seat back assembly attached to a seat back frame, in accordance with various embodiments.
Figure 3B:
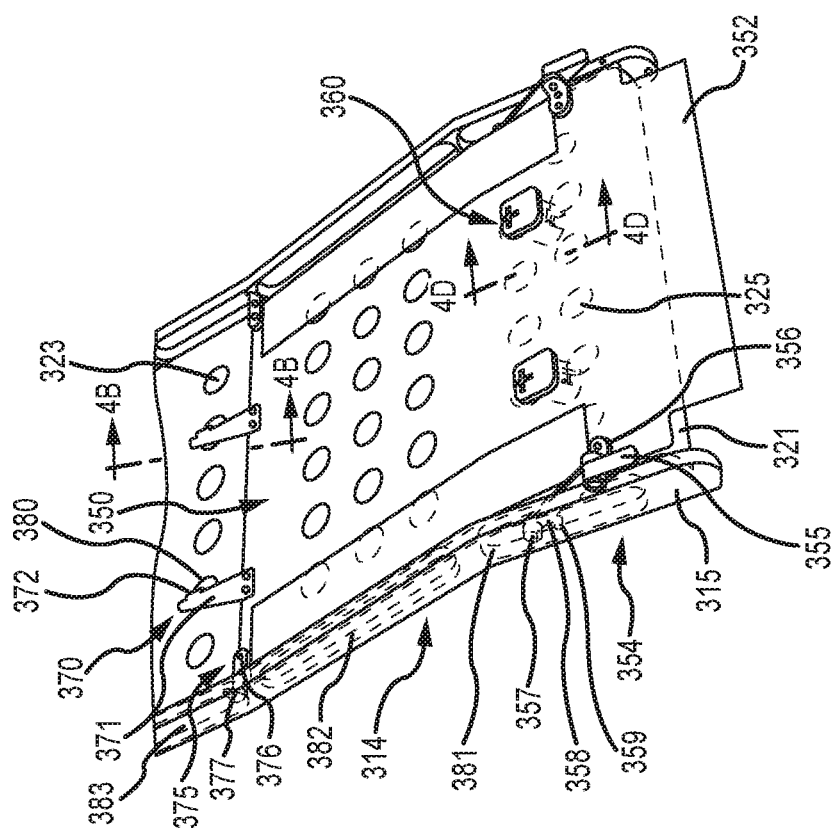

Referring now to FIGS. 3A and 3B, a retrofit seat back assembly 350, such as, for example, the retrofit seat back assembly 250 described above with reference to FIGS. 2A and 2B, is illustrated attached to a seat back frame 314, such as, for example, the seat back frame 114 described above with reference to FIG. 1C. The retrofit seat back assembly 350 is illustrated in both a retracted position (see FIG. 3A) and a deployed position (see FIG. 3B). As will be described in further detail below, the retrofit seat back assembly 350 includes a supplemental recline panel 352 that is attached to the seat back frame 314. In various embodiments, for example, the seat back frame 314 includes a main recline panel 321 having an upper plurality of apertures 323 and a lower plurality of apertures 325. In various embodiments, the seat back frame 314 further includes a pair of frame arms 315, to which the main recline panel 321 may be attached. As will now be described, the retrofit seat back assembly 350 may be operably attached to the seat back frame 314 via the pair of frame arms 315 and one or more of the apertures within the upper plurality of apertures 323 and the lower plurality of apertures 325.

In various embodiments, the retrofit seat back assembly 350 includes a first stabilizer assembly 370 having a first stabilizer bracket 371 and a first stabilizer tab 372 that is configured to be received by and abut against a first aperture 380. In various embodiments, the first aperture 380 is one of the upper plurality of apertures 323. The first stabilizer assembly 370 functions to prevent the retrofit seat back assembly 350 from sliding along the seat back frame 314 during use. In various embodiments, the retrofit seat back assembly 350 may include additional stabilizer assemblies, such as, for example, a second stabilizer assembly having a second stabilizer bracket and a second stabilizer tab that is configured to be received by and abut against a second aperture. In various embodiments, the additional stabilizer assemblies are identical in design and function to the first stabilizer assembly 370 and, therefore, such details are not repeated here.

In various embodiments, the retrofit seat back assembly 350 further includes an actuator which, in various embodiments, may comprise a first actuator 354 having a first lever 355 and a first lever bracket 356 configured to mount the first lever 355 to the supplemental recline panel 352. In various embodiments, the first lever 355 is configured to receive a first roller 357 positioned at a first distal end 358 of the first lever 355 and includes a first protrusion 359 extending outwardly from the first lever 355 proximate the first distal end 358 of the first lever 355. In various embodiments, as described further below, the first roller 357 is configured to roll against an inner surface of a first lower cutout section 381 of a first frame arm 382 (e.g., a first one of the pair of frame arms 315). The first actuator 354 functions to move the supplemental recline panel 352 between the retracted position (see FIG. 3A) and the deployed position (see FIG. 3B). In various embodiments, the retrofit seat back assembly 350 may include additional actuators, such as, for example, a second actuator having a second lever, a second distal end, a second lever bracket and a second roller configured to roll against an inner surface of a second lower cutout section of a second frame arm. In various embodiments, the additional actuators are identical in design and function to the first actuator 354 and, therefore, such details are not repeated here.

In various embodiments, the retrofit seat back assembly 350 further includes a first bias element 360 having a first main body 361, a first spring bracket 362 and a first spring 363 extending between the first main body 361 and the first spring bracket 362. As described further below, the first main body 361 extends through a first lower aperture 340 and is attached to the main recline panel 321 and the first spring bracket 362 is attached to the supplemental recline panel 352. In various embodiments, the first spring 363 (or first bias element) extending between the first main body 361 and the first spring bracket 362 functions to bias the supplemental recline panel 352 toward the main recline panel 321. In various embodiments, the retrofit seat back assembly 350 may include additional bias elements, such as, for example, a second bias element having a second main body, a second spring bracket and a second spring (or second bias element) configured to bias the supplemental recline panel 352 toward the main recline panel 321. In various embodiments, the additional bias elements are identical in design and function to the first bias element 360 and, therefore, such details are not repeated here.

In various embodiments, the retrofit seat back assembly 350 further includes a first pivot member 375 which, in various embodiments, may include a first pivot bracket 376 and a first pivot tab 377 extending from the first pivot bracket 376. In various embodiments, as described further below, the first pivot tab 377 is configured to rotate within an inner surface of a first upper cutout section 383 of the first frame arm 382. The first pivot member 375 functions to enable the supplemental recline panel 352 to rotate, proximate the first pivot member 375, between the retracted position (see FIG. 3A) and the deployed position (see FIG. 3B). In various embodiments, the retrofit seat back assembly 350 may include additional pivot members, such as, for example, a second pivot member having a second pivot bracket and a second pivot tab configured to rotate within an inner surface of a second upper cutout section of a second frame arm. In various embodiments, the additional pivot members are identical in design and function to the first pivot member 375 and, therefore, such details are not repeated here.

Figure 4A:
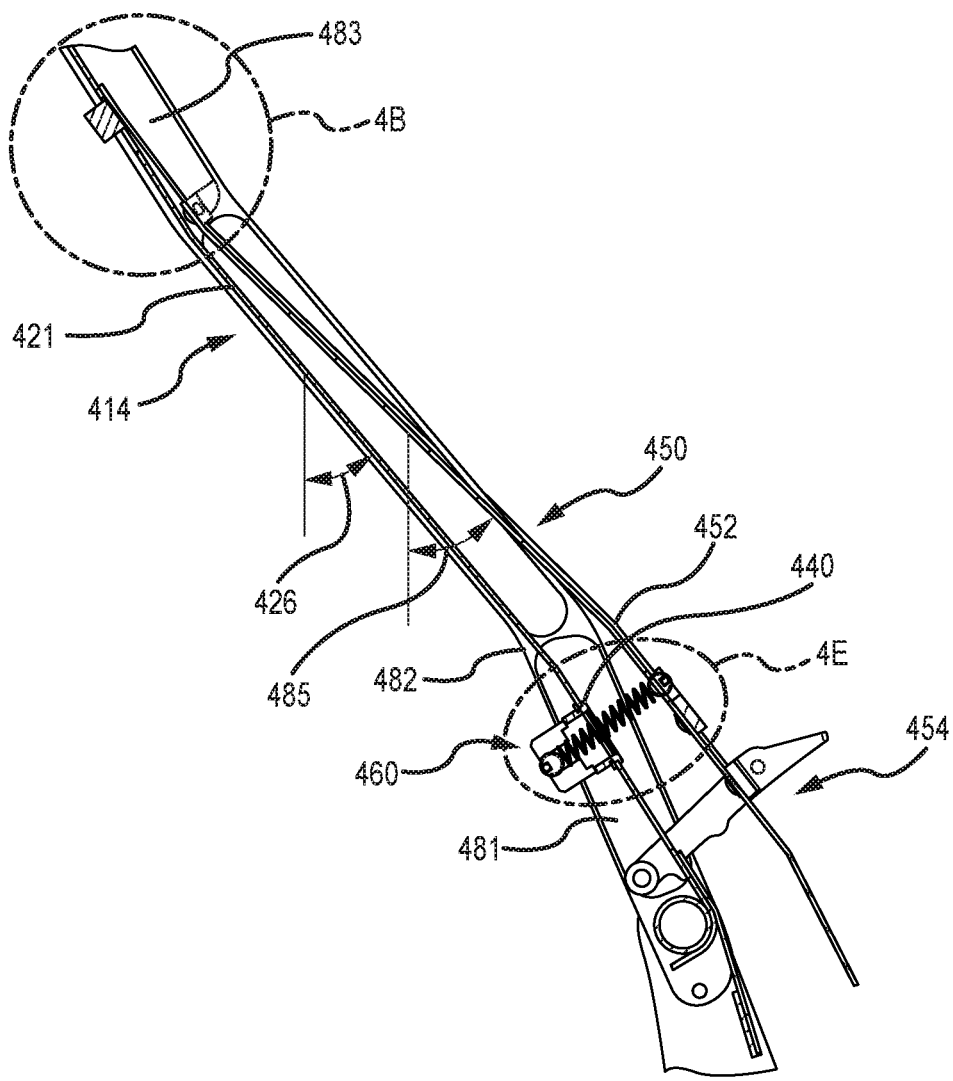
FIGS. 4A, 4B, 4C, 4D and 4E are various close-up schematic views of a retrofit seat back assembly attached to a seat back frame, in accordance with various embodiments.

Referring now to FIGS. 4A-4E, additional details of the construction and operation of a retrofit seat back assembly 450, such as, for example, the retrofit seat back assembly 250 described above with reference to FIGS. 2A and 2B and the retrofit seat back assembly 350 described above with reference to FIGS. 3A and 3B are provided. In describing the embodiments presented in these figures, focus is placed on a single side of the retrofit seat back assembly 450, though it is understood that the same principles apply to a second side or embodiments having multiple numbers of the various components, as is described above with respect to the various embodiments. Referring to FIG. 4A, for example, a schematic side view illustrates the retrofit seat back assembly 450 in a deployed position with respect to a seat back frame 414, which includes a frame arm 482 having a lower cutout section 481 and an upper cutout section 483. The seat back frame 414 further includes a main recline panel 421 that extends between the frame arm 482 and a second frame arm positioned laterally opposite the frame arm 482 (see, e.g., the main recline panel 121 and the pair of frame arms 115 illustrated in FIG. 1C). The retrofit seat back assembly 450 further includes a supplemental recline panel 452. A bias element 460 is disposed between the main recline panel 421 and the supplemental recline panel 452. In various embodiments, the bias element 460 is disposed proximate an actuator 454 that is configured, as described above and further below, to operate the retrofit seat back assembly 450 between a retracted position and a deployed position.

When the retrofit seat back assembly 450 assumes the retracted position, the supplemental recline panel 452 rests against the main recline panel 421 at a seat back angle 426 with respect to the vertical direction. The seat back angle 426 is substantially the same angle of recline that a seat back would assume prior to retrofit (see, e.g., the seat back angle 126 illustrated in FIG. 1C). When the retrofit seat back assembly 450 assumes a deployed position, the supplemental recline panel 452 is urged away from the main recline panel 421, as illustrated, and assumes an extended seat back angle 485. In various embodiments, the seat back angle 426 is about forty degrees (40°) and the extended seat back angle 485 is about forty-five degrees (45°) or greater. Further details regarding the construction and operation of the retrofit seat back assembly 450 are provided below with reference to FIGS. 4B-4E.

Figure 4B:
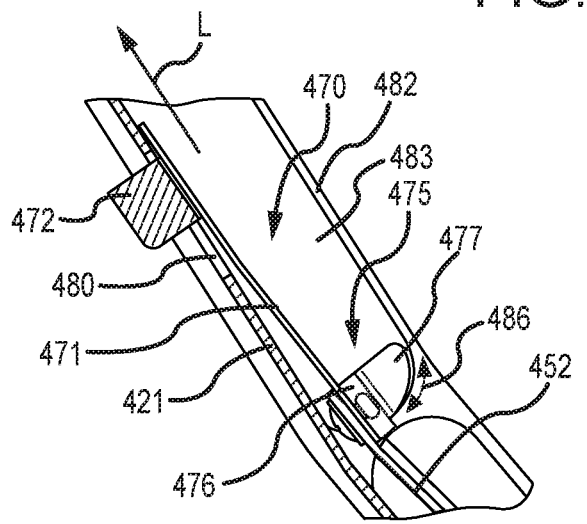
Figure 4C:
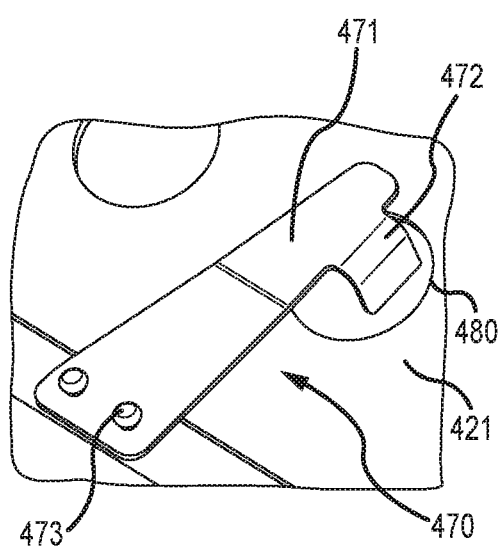

Referring to FIGS. 4B and 4C, an upper end of the retrofit seat back assembly 450 is illustrated, with the supplemental recline panel 452 attached to a stabilizer assembly 470 having a stabilizer bracket 471 and a stabilizer tab 472 extending from the bracket. The stabilizer bracket 471 is connected to the supplemental recline panel 452 via one or more fasteners 473, like threaded screws or rivets or the like.

As illustrated, the stabilizer tab 472 is configured to extend through an upper aperture 480 and abut against the surface of the aperture to prevent the supplemental recline panel 452 from moving in a longitudinal direction L with respect to the main recline panel 421. Referring to FIG. 4B, the upper end of the supplemental recline panel 452 is also illustrated being attached to a pivot member 475. Similar to the description above, the pivot member 475 includes a pivot bracket 476 and a pivot tab 477 extending from the pivot bracket 476. The pivot tab 477 is configured to move in a sliding direction 486 with respect to the inner surface of the upper cutout section 483 such that a rotational movement about an axis extending between the frame arm 482 and the second frame arm positioned laterally opposite the frame arm 482. The rotation enables the supplemental recline panel 452 to pivot between retracted and deployed positions without flexing or bending the material comprising the supplemental recline panel 452 proximate its upper end, thereby extending longevity of the supplemental recline panel 452 following repeated use.

Figure 4D:
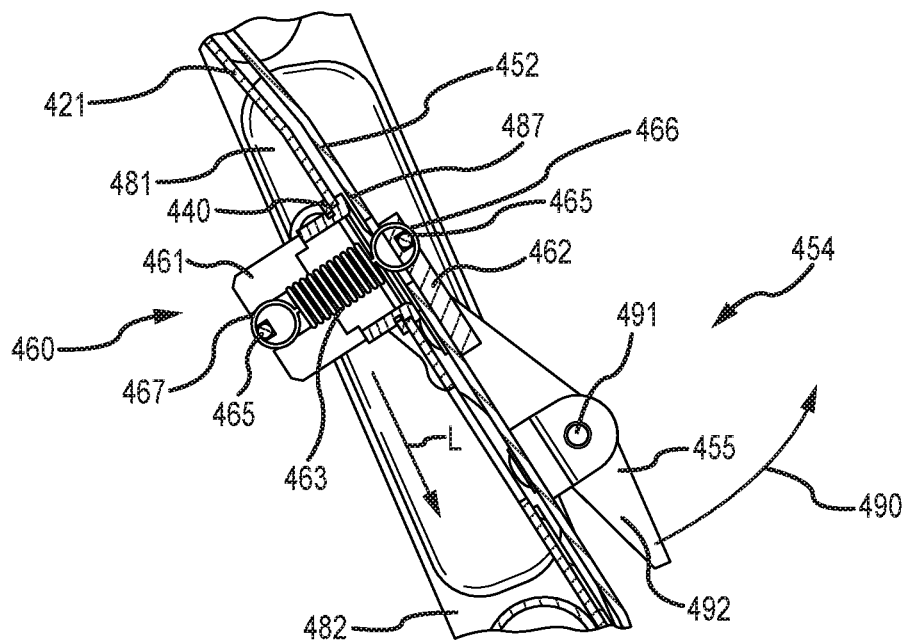
Figure 4E:
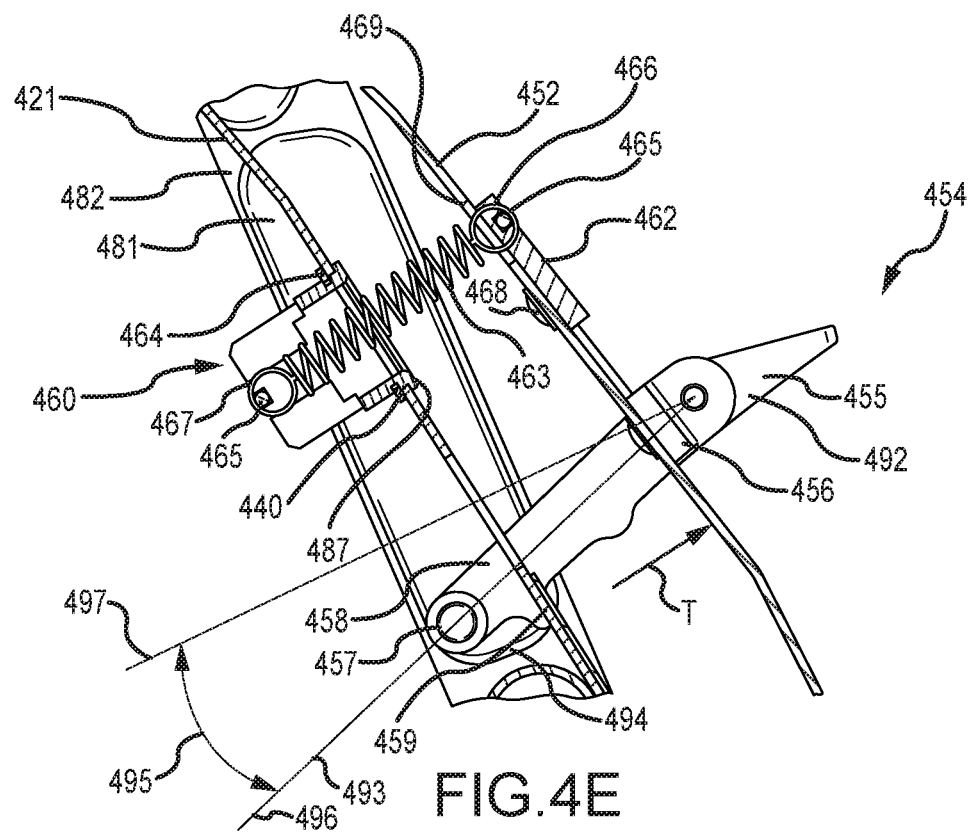

Referring now to FIGS. 4D and 4E, a lower end of the retrofit seat back assembly 450 is illustrated, showing further details of the construction and operation of the actuator 454 and the bias element 460. Referring to FIG. 4D, the retrofit seat back assembly 450 is illustrated in the retracted position. In various embodiments, the bias element 460 includes a main body 461 configured to extend through a lower aperture 440 in the main recline panel 421. The main body 461 includes a flange 487 that abuts a front surface (or first surface) of the main recline panel 421 and prevents the main body 461 from extending completely through the lower aperture 440. In various embodiments, a retaining clip, such as, for example, circlip 464, is disposed within a slot cut into the main body opposite the flange 487, and abuts a rear surface (or second surface) of the main recline panel 421, serving to sandwich a portion of the main recline panel 421 near the perimeter of the lower aperture 440 between the flange 487 and the circlip 464. A bias element, such as a spring 463, extends between a lower portion of the main body 461 and a spring bracket 462. A pair of pins 465 is configured to attach a first end 466 of the spring 463 to the spring bracket 462 and a second end 467 of the spring 463 to the main body 461. In various embodiments, the spring bracket 462 is configured for attachment to the supplemental recline panel 452 by one or more fasteners 468, like threaded screws or rivets or the like that are configured to extend through apertures positioned through the supplemental recline panel 452 and engage with the spring bracket 462. In various embodiments, the spring 463 is configured to extend through an aperture 469 that extends through the supplemental recline panel 452.

In various embodiments, the retrofit seat back assembly 450 further includes the actuator 454 having a lever 455 and a lever bracket 456 configured to mount the lever 455 to the supplemental recline panel 452. In various embodiments, the lever 455 is configured to receive a roller 457 positioned at a distal end 458 of the lever 455 and includes a protrusion 459 extending outwardly from the lever 455 proximate the distal end 458 of the lever 455. In various embodiments, as described above and below, the roller 457 is configured to roll against an inner surface of a lower cutout section 481 of the frame arm 482. The actuator 454 functions to move the supplemental recline panel 452 between the retracted position and the deployed position. For example, while in the retracted position, the lever 455 assumes a position substantially parallel with a length of the surface of the lower cutout section 481 contacted by the roller 457. When transitioning from the retracted position to the deployed position, the lever 455 is rotated in a deployment direction 490 about a pin 491 extending through lever bracket 456 and the lever 455. Rotation of the lever 455 about the pin 491 causes the roller 457 at the distal end 458 to roll in a longitudinal direction L along the inner surface of the lower cutout section 481, thereby causing a proximal end 492 of the lever 455 to move in a transverse direction T, substantially normal to the longitudinal direction L. Moving the proximal end 492 of the lever 455 in the transverse direction causes the supplemental recline panel 452 to also move in the transverse direction T until a fully deployed position is reached.

As illustrated in FIG. 4E, during the deployment process, the lever 455 will reach a point wherein a line 493 extending through the pin 491 and the roller 457 is substantially normal to the longitudinal direction L. At this point, the deployment process assumes an unstable (or metastable) state, such that the lever 455 can either reverse direction and return to the retracted position, under the pull of the spring 463, or continue rotating in the deployment direction 490, also under the pull of the spring 463. In various embodiments, the surface of the lower cutout section 481 extends sufficiently far along the longitudinal direction L such that the lever 455 may continue to rotate in the deployment direction 490, beyond the unstable state, until the roller 457 and the protrusion 459 abut a locking end 494 of the lower cutout section 481. At this point in the deployment process, the lever 455 has rotated to a point such that a locking angle 495 is achieved between the fully deployed position 496 of the lever 455 and the unstable position 497 of the lever 455. In various embodiments, the locking angle 495 is from about five degrees (5°) to about fifteen degrees (15°), ensuring the lever 455 cannot inadvertently return to the retracted position. To transition from the fully deployed position to the retracted position, the operation and steps described above are reversed.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A retrofit seat back assembly, comprising:
   a supplemental recline panel having an upper end and a lower end;
   a pivot member disposed proximate the upper end and configured to pivotally engage a seat back frame of a stowable seat;
   an actuator disposed proximate the lower end and configured to operably engage the seat back frame and move the supplemental recline panel between a retracted position adjacent the seat back frame and a deployed position spaced forwardly from the seat back frame; and
   a bias element disposed between the supplemental recline panel and the seat back frame and configured to urge the supplemental recline panel toward the seat back frame;
   wherein the bias element comprises a spring having a first spring end connected to the supplemental recline panel and a second spring end connected to the seat back frame;
   wherein the bias element further comprises a main body configured for disposition within a lower aperture of the seat back frame and wherein the second spring end is connected to the main body; and
   wherein the main body comprises a flange configured to engage a first surface of the seat back frame and is configured to receive a retaining clip proximate a second surface of the seat back frame.

2. The retrofit seat back assembly of claim 1, wherein the bias element further comprises a spring bracket configured for disposition on the supplemental recline panel and wherein the first spring end is connected to the spring bracket.

3. The retrofit seat back assembly of claim 1, wherein the actuator comprises a lever pivotally attached to the supplemental recline panel proximate the lower end, the lever having a distal end configured for rolling engagement with the seat back frame.

4. The retrofit seat back assembly of claim 3, wherein the seat back frame includes a frame arm having a lower cutout section and wherein the distal end of the lever includes a roller configured for rolling engagement with a surface of the lower cutout section.

5. The retrofit seat back assembly of claim 4, wherein the roller is configured to abut a locking end of the lower cutout section when the supplemental recline panel assumes the deployed position.

6. The retrofit seat back assembly of claim 1, wherein the seat back frame includes a frame arm having an upper cutout section and wherein the pivot member comprises a pivot tab configured to engage a surface of the upper cutout section of the frame arm.

7. The retrofit seat back assembly of claim 6, further comprising a stabilizer bracket configured to engage an upper aperture of the seat back frame.

8. A seat back assembly configured to retrofit a stowable seat having a seat back frame, the seat back assembly comprising:
   a supplemental recline panel having an upper panel end, a lower panel end, a first panel side and a second panel side;
   a first pivot tab attached to the upper panel end and configured to pivotally engage a first frame arm of the seat back frame;
   a second pivot tab attached to the upper panel end and configured to pivotally engage a second frame arm of the seat back frame;
   a first lever pivotally connected to the lower panel end and configured to operably engage the first frame arm of the seat back frame between a retracted position and a deployed position;
   a second lever pivotally connected to the lower panel end and configured to operably engage the second frame arm of the seat back frame between the retracted position and the deployed position; and
   a first bias element disposed proximate the first lever and between the supplemental recline panel and the seat back frame and configured to urge the supplemental recline panel toward the seat back frame;
   wherein the first bias element includes a first spring connected to the supplemental recline panel and to the seat back frame;
   wherein the bias element comprises a spring having a first spring end connected to the supplemental recline panel and a second spring end connected to the seat back frame;
   wherein the bias element further comprises a main body configured for disposition within a lower aperture of the seat back frame and wherein the second spring end is connected to the main body; and
   wherein the main body comprises a flange configured to engage a first surface of the seat back frame and is configured to receive a retaining clip proximate a second surface of the seat back frame.

9. The seat back assembly of claim 8, further comprising a second bias element disposed proximate the second lever and between the supplemental recline panel and the seat back frame and configured to urge the supplemental recline panel toward the seat back frame.

10. The seat back assembly of claim 9, wherein the second bias element includes a second spring connected to the supplemental recline panel and to the seat back frame.

11. The seat back assembly of claim 8, wherein the first lever comprises a first distal end configured for rolling engagement with a first lower cutout section of the first frame arm of the seat back frame.

12. The seat back assembly of claim 11, wherein the second lever comprises a second distal end configured for rolling engagement with a second lower cutout section of the second frame arm of the seat back frame.

13. The seat back assembly of claim 12, wherein the first distal end of the first lever includes a first roller configured for rolling engagement with a first surface of the first lower cutout section and the second distal end of the second lever includes a second roller configured for rolling engagement with a second surface of the second lower cutout section.

14. A method of retrofitting a stowable seat having a seat back frame, comprising: providing a retrofit seat back assembly, comprising:
   a supplemental recline panel having an upper end and a lower end,
   a pivot disposed proximate the upper end and configured to pivotally engage the seat back frame of the stowable seat,
   a lever disposed proximate the lower end and configured to operably engage the seat back frame and move the supplemental recline panel between a retracted position adjacent the seat back frame and a deployed position spaced forwardly from the seat back frame, and
   a bias element configured for disposition between the supplemental recline panel and the seat back frame and configured to urge the supplemental recline panel toward the seat back frame;
   wherein the bias element comprises a spring having a first spring end connected to the supplemental recline panel and a second spring end connected to the seat back frame;
   wherein the bias element further comprises a main body configured for disposition within a lower aperture of the seat back frame and wherein the second spring end is connected to the main body; and
   wherein the main body comprises a flange configured to engage a first surface of the seat back frame and is configured to receive a retaining clip proximate a second surface of the seat back frame;
   assembling the retrofit seat back assembly onto the seat back frame.

15. The method of claim 14, wherein the assembling the retrofit seat back assembly onto the seat back frame includes:
   engaging the pivot with an upper cutout section of a frame arm of the seat back frame;
   engaging a distal end of the lever with a lower cutout section of the frame arm; and
   connecting the spring between the supplemental recline panel and the seat back frame.

* * * * *

UNITED STATES PATENT AND TRADEMARK OFFICE
CERTIFICATE OF CORRECTION

PATENT NO. : 10,633,096 B1
APPLICATION NO. : 16/200769
DATED : April 28, 2020
INVENTOR(S) : Douglas E Hoover Page 1 of 1

It is certified that error appears in the above-identified patent and that said Letters Patent is hereby corrected as shown below:

On the Title Page

Column 1, Item (56) insert:
-- Prior Publication Data US 2020/0115058 A1 Apr. 16, 2020 --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*